United States Patent [19]
Beckett et al.

[11] Patent Number: 5,718,570
[45] Date of Patent: Feb. 17, 1998

[54] ROTARY CONTROL VALVE FOR A PISTON PUMP

[75] Inventors: Carl D. Beckett; Kevin O'Hara; Daniel B. Olsen, all of Vancouver, Wash.

[73] Assignee: Micropump Corporation, Portland, Oreg.

[21] Appl. No.: 407,405

[22] Filed: Mar. 20, 1995

[51] Int. Cl.⁶ .................................. F16H 39/10
[52] U.S. Cl. .................. 417/517; 417/503; 417/519; 137/625.21
[58] Field of Search ................ 417/517, 519, 417/269, 502, 503, 533, 532; 137/624.13, 625.46, 625.21

[56] References Cited

U.S. PATENT DOCUMENTS

| | | |
|---|---|---|
| 646,024 | 3/1900 | Goodhart. |
| 1,506,892 | 9/1924 | Egersdorfer ............... 417/503 |
| 1,519,670 | 12/1924 | Danstrup ................. 417/517 |
| 1,723,874 | 8/1929 | Lunge. |
| 2,010,377 | 8/1935 | Sassen. |
| 2,225,788 | 12/1940 | McIntyre. |
| 2,397,594 | 4/1946 | Buchanan. |
| 2,458,294 | 1/1949 | Parker. |
| 2,600,099 | 6/1952 | Detrez ................. 137/625.21 |
| 2,745,350 | 5/1956 | Capsek. |
| 3,272,079 | 9/1966 | Bent. |
| 3,302,528 | 2/1967 | Rosenhaft ............... 137/625.21 |
| 3,451,428 | 6/1969 | Pruett .................. 137/625.46 |
| 3,702,143 | 11/1972 | Van Wagenen et al. ..... 137/625.21 |
| 3,720,353 | 3/1973 | Stettler ................ 417/519 |
| 3,816,029 | 6/1974 | Bowen et al.. |
| 3,823,557 | 7/1974 | VanWagenen et al.. |
| 4,028,018 | 6/1977 | Audsley. |
| 4,359,312 | 11/1982 | Funke et al.. |
| 4,432,310 | 2/1984 | Waller. |
| 4,556,371 | 12/1985 | Post. |
| 4,687,426 | 8/1987 | Yoshimura. |
| 5,261,451 | 11/1993 | Spencer ................ 137/625.21 |

FOREIGN PATENT DOCUMENTS

| | | |
|---|---|---|
| 0 172 780 | 6/1984 | European Pat. Off.. |
| 658937 | 3/1938 | Germany. |
| 566020 | 8/1977 | U.S.S.R.. |
| 768330 | 2/1957 | United Kingdom. |

Primary Examiner—Timothy Thorpe
Assistant Examiner—Ted Kim
Attorney, Agent, or Firm—Klarquist Sparkman Campbell Leigh & Whinston, LLP

[57] ABSTRACT

A reciprocating piston pump provides pulsation free delivery of liquid. It is suitable for use in compact environments or for the delivery of small amounts of liquid, as in chromatographic analysis devices. The pump includes two pistons with pumping chambers that are alternately connected to inflow and outflow lines through a control valve. The control valve moves between a first position in which inflow is directed to the first piston chamber and outflow to the second piston chamber, and a second position in which outflow is directed to the first piston chamber and inflow is directed to the second piston chamber. Each outflow pulse from the piston is sustained longer than each inflow pulse, and the outflow pulses are staggered and partially superimposed to provide substantially pulsation free delivery of liquid from the pump. A rotating cam moves the pistons of the pumps and the control valve between their operating positions described above. The cam rotates at a constant speed around an axis that is parallel to the axis of movement of the piston pumps.

29 Claims, 6 Drawing Sheets

ROTARY CONTROL VALVE FOR A PISTON PUMP

BACKGROUND OF THE INVENTION

1. Field of the Invention

This invention concerns a rotary control valve that is useful in directing the flow of fluid, such as liquid through a pump. This valve is particularly suited for supplying liquids used in dual piston pumps and chromatographic analysis devices.

2. General Description of the Background

Constant volume, pulsation-free reciprocating pumps have been disclosed in U.S. Pat. Nos. 3,816,029; 4,028,018; 4,687,426 and 4,556,371. A piston pump using a spool valve to control liquid outlet from the pistons is similarly shown in European Patent No. A20 172 780.

Pulsation-free delivery of a liquid is described in detail in U.S. Pat. No. 4,359,312, which discloses a reciprocating piston pump with two pistons connected in parallel on the discharge side. One of the pistons draws in fluid while the other is delivering fluid. The pistons are controlled by a cam, which is in turn operated by a computer program to compensate for the compressibility of liquid in the pump. The rotational speed of the cam is varied to compensate for the compressibility of liquid in the pump and achieve a constant pump output. Fluid into and out of the piston pumps is controlled by an inlet and outlet valve for each piston in the pump.

U.S. Pat. No. 2,010,377 describes a dual piston pump that achieves non-pulsating fluid output by overlapping the power strokes of each piston in the pump, and controlling the volumetric displacement of the pump per cycle. The combined delivery of the two pistons, per unit time, is said to be substantially constant or non-fluctuating. A pair of parallel cams, which move the pistons through their strokes, rotate around an axis perpendicular to the longitudinal axes of the pistons. A sliding spring valve opens with the intake stroke of a piston, and closes when the intake stroke is finished.

Each of the pumps shown in the patents described above is relatively large and not well adapted for pumping and delivering very small amounts of liquid at a constant volume, as required in chromatographic analyzers. The prior pumps are particularly unsuitable for placement in a compact pumping assembly. Some of these previous pumps also suffer from the disadvantage of requiring complicated computer programs and automated control mechanisms to achieve constant pump output. The inlet and outlet valves are usually separate from each other and the actuating cam, multiplying the number of parts in the pump, and increasing the likelihood of mechanical problems. They also lack a simple valve mechanism for controlling the flow of liquid through the dual piston pump.

It is accordingly an object of the present invention to provide a dual piston pump that is compact and suitable for delivery of very small amounts of liquid.

It is yet another object of this invention to provide such a pump that is compact, and uses a minimal number of moving parts.

Yet another object of the invention to provide a piston pump that is simpler in operation than some previous pumps, and particularly is free of the necessity for complex mechanical or computer-assisted operation to provide pulsation-free delivery of liquid.

Finally, it is an object to achieve these goals by providing an efficient, compact valve that controls the flow of fluid through a dual piston pump or similar device.

SUMMARY OF THE INVENTION

The foregoing objects are achieved in the present invention by providing a pump that has a housing containing first and second spring-biased piston pumps. The first piston pump includes a first elongated piston bore with a reciprocating piston disposed therein, and an enlarged volume area in the first piston bore that forms a first pumping chamber. The second piston pump similarly includes a second elongated piston bore with a second reciprocating piston disposed in the second piston bore, and an enlarged volume area in the second piston bore that forms a second pumping chamber.

An inlet flow path is provided through the housing that communicates with the first pumping chamber when the first piston is reciprocating in a direction that draws fluid into the first pumping chamber. The inlet flow path alternately communicates with the second pumping chamber when the second piston is reciprocating in a direction that draws fluid into the second pumping chamber. An outlet flow path is also provided through the housing to communicate with the first pumping chamber when the first piston is reciprocating in a direction that expels fluid out of the first pumping chamber. The outlet flow path alternately communicates with the second pumping chamber when the second piston is reciprocating in a direction that expels fluid out of the second pumping chamber.

A control valve in the housing alternately moves between a first position and a second position. When the control valve is in the first position:

(a) the inlet flow path to the first pumping chamber is continuous;

(b) the outlet flow path from the first pumping chamber is interrupted;

(c) the inlet flow path to the second pumping chamber is interrupted; and (d) the outlet flow path from the second pumping chamber is continuous.

When the control valve is in the second position:

(a) the inlet flow path to the second pumping chamber is continuous;

(b) the outlet flow path from the second pumping chamber is interrupted;

(c) the inlet flow path to the first pumping chamber is interrupted; and (d) the outlet flow path from the first pumping chamber is continuous.

The control valve is a rotary control valve that includes a control member having a control surface, and a cover juxtaposed to the control surface, such that the control surface and cover move relative to each other through a plurality of positions, for example as the control surface rotates relative to the cover. A fluid passageway is formed between the cover and control surface, while first and second bores through the cover establish fluid communication with each other through the fluid passageway in at least one of the plurality of positions as the control surface and cover move relative to each other. The first bore is preferably an inlet bore connected to an inlet line, and the second bore is an outlet bore connected to an outlet line. The movement of the control surface and cover relative to each other brings the inlet bore and outlet bore simultaneously into fluid communication with the passageway such that fluid flows from the inlet line, through the passageway, and out of the outlet line.

The control member may be a disc, with the control surface on a flat upper surface of the disc. The disc rotates about an axis of disc rotation relative to the disc cover, and the passageway is cooperatively formed by the cover and the groove in the control surface. The passageway includes a first portion that falls on a first circle having a center of curvature at the axis of rotation of the disc, and the distance of the first bore from the axis of disc rotation is the same as the radius of the first circle. The first passageway portion is therefore in fluid communication with the first bore as the disc rotates through at least a portion of its rotation, and the passageway further includes a second passageway portion that is in fluid communication with the second bore through at least a portion of the rotation of the disc. The second passageway portion falls on a second circle having a center of curvature at the axis of rotation of the disc. The radius of the second circle, however, is different than the radius of the first circle. The first and second passageway portions are fluidly connected by a third passageway portion.

In a more specific embodiment of the rotary control valve, first and second fluid passageways are formed between the cover and control surface by grooves inscribed in the control surface. First, second, third and fourth bores extend through the cover, wherein the first bore is an inlet bore, and the second bore is an outlet bore. The first fluid passageway includes a first portion that is always in fluid communication with the first bore as the surface and cover move relative to each other, and a second portion that is in fluid communication with the third bore in only some of the plurality of positions. The second fluid passageway includes a first portion that is always in fluid communication with the second bore, and a second portion that is in fluid communication with the fourth bore in only some of the plurality of positions.

The second portion of the first fluid passageway is in fluid communication with the fourth bore in some of the plurality of positions, and the second portion of the second fluid passageway is in fluid communication with the third bore in some of the plurality of positions. The first and second fluid passageways, however, are not in fluid communication with each other. Hence rotation of the control disc directs fluid from the inlet passageway alternately through the third or fourth bores, which lead to pumping chambers of the dual piston pump. Similarly, rotation of the disc directs fluid from the pumping chambers, alternately through the third and fourth bores, and through the second passageway to the outlet line.

The bore axes for the two piston bores are substantially parallel, and each reciprocating piston is reciprocated by a cam that rotates about an axis parallel to the bore axes. The cam moves the first and second pistons in such a manner that the first piston pump expels fluid while the second piston pump draws fluid in, and the first piston pump draws in fluid while the second piston pump expels fluid. The cam further moves the control valve between the first and second positions, with the control valve in the first position during the period in which the first piston pump draws in fluid and the second piston pump expels fluid. The control valve is moved to assume the second position when the first piston pump expels fluid and the second piston pump draws in fluid.

It is a particular advantage of the present invention that the cam has an impingement surface that impinges the pistons, and reciprocates them in such a manner that fluid delivery from the pump is substantially constant. Such constant fluid delivery is achieved by providing an impingement surface on the cam that alternately displaces each piston in a positive displacement direction away from a neutral position to create a positive pressure that expels fluid from the pumping chamber. Such positive displacement of each piston is followed by a reversal of piston direction to a negative displacement direction, which creates a negative pressure that draws fluid into each pumping chamber. The period of time during which negative displacement of each piston occurs is less than the period of time during which positive displacement of each piston occurs. Moreover, the positive displacement of the first and second pistons are in staggered phases, such that the output flows of the first and second piston pumps are superimposed to provide a substantially continuous fluid flow from the pump.

DETAILED DESCRIPTION OF THE PREFERRED EMBODIMENT

Figure 3:
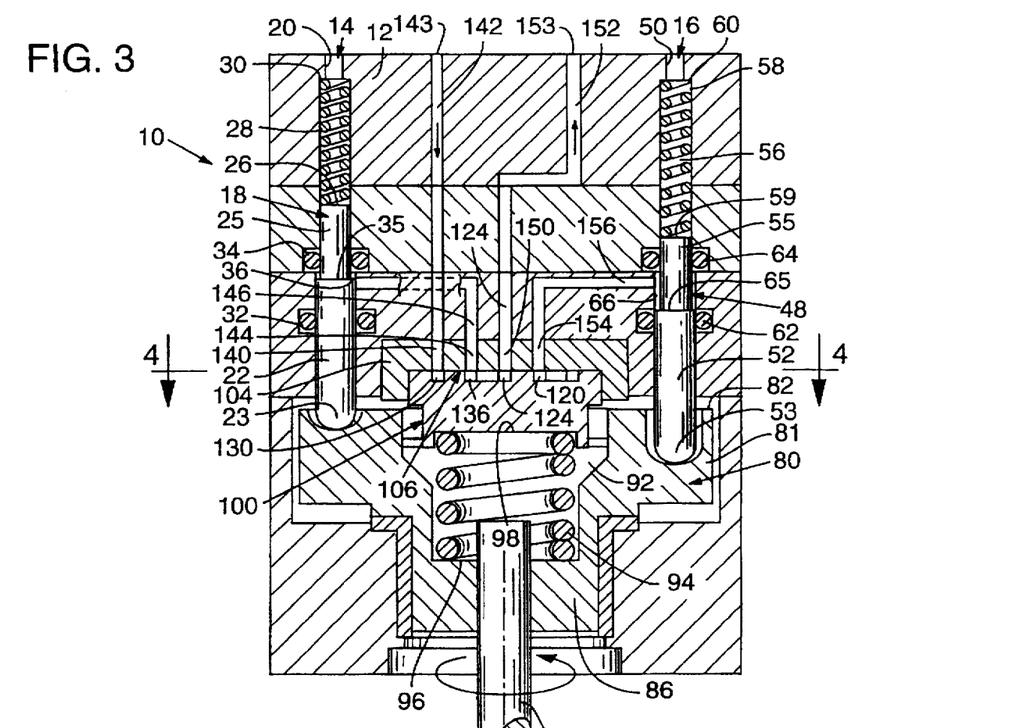
FIG. 3 is a cross-sectional view through a first embodiment of the piston pump of the present invention.

A dual piston pump 10, shown in FIG. 3, is capable of substantially pulseless delivery of a fluid, such as liquid water. The pump includes a housing 12 that contains first pump piston assembly 14 and second pump piston assembly 16. First assembly 14 includes a reciprocating first piston 18 in a first piston bore 20 that extends from an upper surface of housing 12. Piston 18 has a large diameter portion 22 that fits within a correspondingly enlarged diameter portion of bore 20. The piston has a rounded bearing tip 23 that extends into a cam chamber 24 to engage a cam bearing surface. Piston 18 also includes a reduced diameter portion 25 with an upper spring seat surface 26, that fits within a reduced diameter portion of bore 20. Piston 18 is capable of reciprocating in bore 20 against the bias of a helical spring 28 with an upper end that seats against an internal shoulder 30 of bore 20, and spring 28 extends through bore 20 to sit on a flat upper face 26 of portion 25 of piston 18.

A pair of parallel, spaced, annular seals 32, 34 are placed around piston 18 with seal 32 circumscribing portion 22, and seal 34 circumscribing portion 25 slightly above an annular face 35 between portions 22, 25 of piston 18. A first pumping chamber 36 is formed in the bore 20 by the necked down portion of piston 18, and extends from seal 34 to the annular face 35. Chamber 36 is shown in a compressed condition in FIG. 3, but the chamber expands as piston 18 is forced downwardly by spring 30, and the expanding chamber creates a suction pressure that draws liquid into the chamber in a manner described below.

Second assembly 16 is similar to assembly 14 described above. Second assembly 16 includes a reciprocating piston 48 in second piston bore 50 that extends from an upper surface of housing 12 through to cam chamber 24, where it abuts a cam raceway described below. Piston 48 has a large diameter portion 52 that fits within a correspondingly enlarged diameter portion of bore 50. The piston has a rounded bearing tip 53 that extends into cam chamber 24. Piston 48 also has a reduced diameter portion 55. Piston 48 is capable of reciprocating in bore 50 against the bias of a helical spring 58 that seats on an internal shoulder 60 of bore 50 and extends through bore 50 to also seat on a flat upper face 59 that forms the top surface of portion 55 of piston 48.

A pair of parallel, spaced, seals 62, 64 are placed around piston 48 with seal 62 circumscribing portion 52, and seal 64 circumscribing portion 55 slightly above an annular face 65 between portions 52, 55 of piston 48. A pumping chamber 66 is formed in the bore 50 by the necked down portion of piston 48. Chamber 66 extends from seal 64 to annular face 65. Chamber 66 is shown in a fully expanded condition in FIG. 3, with piston 48 displaced completely downward by the expansion of spring 58 and the changing surface of the cam described below. The volume of chamber 66 will diminish as piston 48 is subsequently moved upwardly, which will create a positive pressure in chamber 66 as its volume is reduced.

Large diameter portions 22, 52 of pistons 18, 48 extend into cam chamber 24 to contact a raceway 84 of cam 80. The cam moves at a constant rotational speed and has a surface that impinges against the pistons 18, 48 to reciprocate them against the bias of their respective springs 28, 58. Cam 80 includes a cylindrical cam collar 81 having a flat upper bearing surface 82 (FIGS. 3 and 4) with a continuous annular cam raceway 84 having a center of curvature at the axis of rotation of the cam. The bearing tips 23, 53 of pistons 18, 48 abut against and ride within the groove 84, and are maintained in contact therewith by the bias of springs 28, 58. Raceway 84 has a varying depth, described further below, which moves pistons 18, 48 against the bias of springs 28, 58 to stagger the pulsatile outflow from each of piston assemblies 14, 16 and achieve substantially continuous liquid outflow from pump 10.

Figure 4:
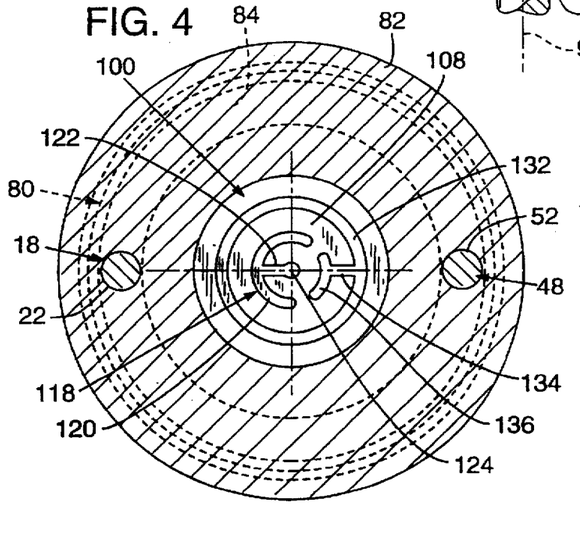
FIG. 4 is a view of the cam and control valve for the piston pump, taken along lines 4—4 of FIG. 3, with the position of control valve passageways shown on the cam, showing the position of the control valve passageways after the control valve has rotated through a 180 degree rotation from the position shown in FIG. 3.
Figure 5:
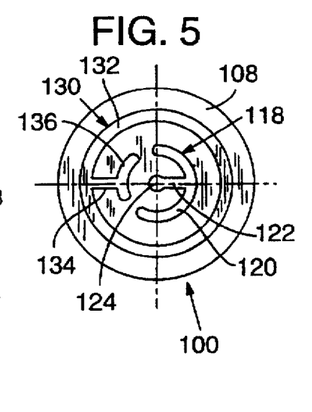
FIG. 5 is a view of the control valve portion of FIG. 3.

Cam 80 further includes a downwardly extending annular bearing collar 86 through which a drive shaft 88 extends. Shaft 88 is fixed to collar 86 to rotate cam 80 as shaft 88 rotates. Shaft 88 extends along the axis of rotation 90 of collars 81, 86, and the axis 90 is substantially parallel to the longitudinal axes of bores 20, 50. An interior spring chamber 92 of cam 80 contains a helical spring 94 that is seated on annular surface 96 around shaft 88. Spring 94 extends upwardly around a portion of shaft 88 and toward a flat bearing face 98 of a control valve 100 (FIGS. 3–5), to support the control valve. Control valve 100 is carried by cam 80 and rotates with collar 81. A wear plate 104 is fixed to housing 12, does not rotate with cam 80, and has an internal bearing surface 106 (FIG. 3) that bears against opposing bearing surface 82 (FIGS. 4–5).

Bearing surface 108, on the upper surface of control valve 100, has a series of grooves inscribed thereon that, in cooperation with the overlying stationary plate 104, form enclosed passageways that direct the flow of fluid through the control valve 100. A first groove complex 118 is generally epsilon-shaped, with an arcuate back 120 and a straight cross portion 122 that extends toward and terminates at an axis of rotation 124 of the control valve 100 (which is coincident with the axis of rotation 90). The portion of the passageway at the axis of rotation 124 is enlarged (compared to the width of the remainder of groove complex 118) and cylindrical or hemispherical. Arcuate back 120 falls on a portion of a circle that has a center of curvature at axis 124.

A second groove complex 130 is also inscribed into surface 108. Complex 130 includes an annular groove 132 that circumscribes first groove complex 118, and has the same center of curvature as arcuate back 120, but a greater radius of curvature. A side-arm groove 134 extends from groove 132, toward axis 124, but stops short of reaching it. Groove 134 terminates in an arcuate groove 136 that is on the same circle as arcuate back 120, but does not overlap groove 120. Groove 136 has the same center of curvature and radius of curvature as groove 120. Each of groove complexes 118, 130 are covered by internal bearing surface 106 of wear plate 104, which forms a fluid tight seal with the grooves, such that the groove complexes 118, 130 and bearing surface 106 form fluid passageways of the same configuration as the grooves described above.

An inlet bore 140 extends through plate 104 from the internal surface 106 thereof, and the distance from axis 124 to groove 132 is the same as the radius of the circle formed by groove 132. Hence, bore 140 communicates with the passageway formed by annular groove 132 at all times during the rotation of cam 80. Bore 140 also communicates with an inlet flow path line 142 that extends through housing 12 to the exterior thereof, for connection through an orifice 143 to a source of liquid (not shown) that is to be pumped through pump 10.

A first pumping chamber bore 144 also extends through plate 104, with the distance from axis 124 to bore 144 the same as the radius of the circle on which grooves 120, 136 are inscribed. Hence, bore 144 is positioned to communicate with the arcuate passageway formed by groove 120 when control valve 100 is in the position shown in FIG. 4, and to communicate with the passageway formed with arcuate groove 136 when control valve 100 has rotated to the position shown in FIG. 5. As demonstrated in the drawing, groove 120 extends through an arc of about 200 degrees, while groove 136 extends through an arc of only about 90 degrees, hence bore 144 will communicate with groove 120 through about 200 degrees of rotation of cam 80. Bore 144 will communicate with groove 136 through only about 90 degrees of rotation. Bore 144 extends away from surface 108 to communicate with first chamber fluid line 146 that extends through housing 12 to first pumping chamber 36.

Through line 146, pumping chamber 36 alternately communicates with first groove complex 118 (through arcuate groove 120) and second groove complex 130 (through groove 136).

An outlet bore 150 extends through wear plate 104 to connect the end portion of groove 122 at axis of rotation 124 with an outlet flow line 152 that extends through housing 12 to communicate with an outlet line (not shown) that delivers fluid from pump 10 through an orifice 153. Finally, a second pumping chamber bore 154 extends through plate 104 at a distance from axis 124 that is equal to the radius of the common circle on which grooves 120, 136 are formed. Hence, bore 154 is positioned to contact groove 136 when control valve 100 is in the position of FIG. 4, and alternately contact groove 120 when valve 100 is in the position shown in FIG. 5. In between these two positions, bore 154 will communicate with groove 120 through about 200 degrees of rotation of cam 80, and with groove 136 through about 90 degrees of cam rotation. Bore 154 communicates with a second pumping chamber passageway 156 that in turn extends through housing 12 to communicate with second pumping chamber 66.

Bores 140, 144, 150 and 154 are all aligned on a common diameter of the surface 108 of cylindrical valve member 102.

Figure 7:
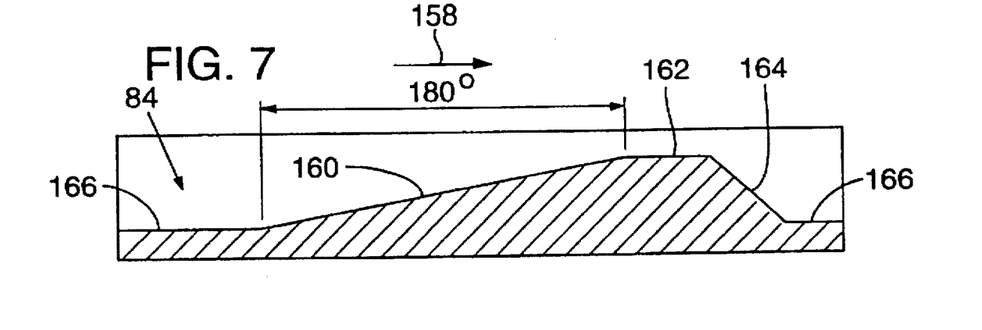
FIG. 7 is a schematic view of a continuous cross-section through a cam raceway of the operating cam of FIGS. 3-5, illustrating the groove configuration that controls the power stroke of each piston and permits precise, constant volumetric displacement of a small volume of liquid.

Assemblies 14, 16 operate by reciprocation of pistons 18, 48 as cam 80 rotates through a complete revolution around axis 90, and cam raceway groove 84 in bearing surface 82 moves the pistons in a specific, coordinated manner to provide a substantially constant volumetric flow rate of liquid through outlet line 152. Cam raceway 84 is shaped as shown in FIG. 7, wherein the cam raceway cross-section is shown as a longitudinal section to better illustrate the changing depth of the raceway throughout its circumference. The cam 80 rotates in a direction such that free ends of the pistons abut against and ride over the raceway in the direction of arrow 158. The pistons are spaced 180 degrees apart on the circular raceway, and have simultaneous movements that will be more fully detailed in FIG. 10.

The raceway has an upwardly inclined segment 160, followed by a horizontal segment 162 that is parallel to top surface 82 of cam 80, and then a downwardly inclined segment 164. A horizontal segment 166 is then followed by the upwardly sloping segment 160, as the continuous raceway circuit is completed and begins to repeat. Flat surface 166 is formed by the flat bottom surface of raceway 84. Upward incline 160 is longer and less steep than downwardly inclined surface 164.

Figure 10:
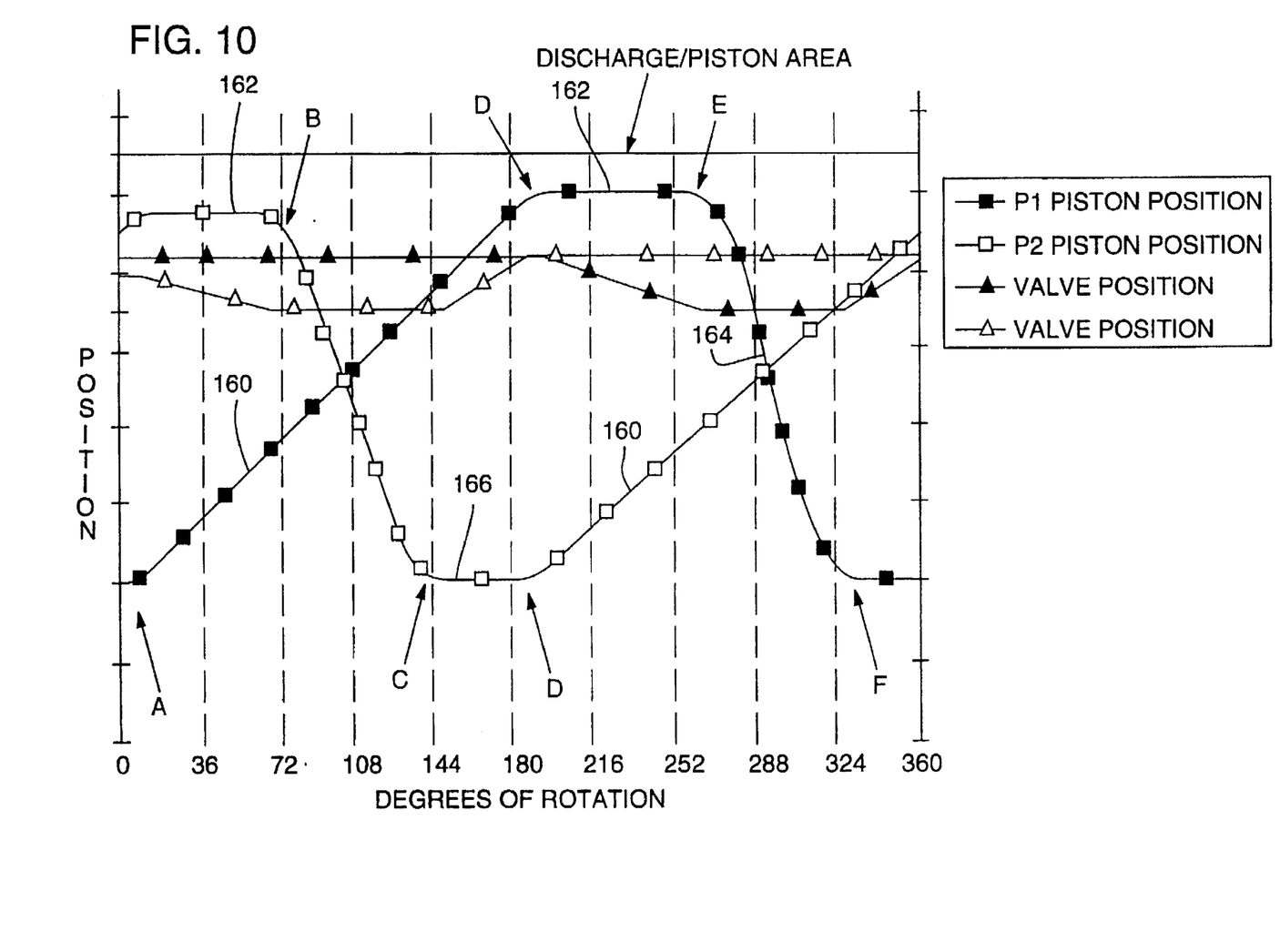
FIG. 10 is a graph showing the piston and valve positions, as the operating cam rotates through a 360 degree cycle.

The dimensional relationships of surfaces 160–166 are better illustrated in FIG. 10. The lines labeled P1 Position and P2 Position refer to the position of the first piston P1 (piston 18) and second piston P2 (piston 48), where the free end of each piston 18, 48 abuts the surface of raceway 84. Hence, the P1 and P2 position also traces the configuration of the raceway surface that moves the pistons. The segments 160–166 are therefore labeled on the graph of FIG. 10. Piston 18 (P1) has an initial upward displacement along raceway incline 160, followed by a period of zero displacement as the piston rides along flat raceway segment 162. Piston 18 then undergoes a steep downward displacement along surface 164, and then a period of zero displacement along flat bottom raceway segment 166. Piston 48 (P2) similarly has an upper period of zero displacement as it rides along top flat segment 162, followed by steep downward displacement along segment 164, then a period of zero displacement along flat bottom segment 166, followed by upward displacement along raceway incline 160. The movements of pistons 18, 48 are identical, but 180 degrees out of phase. Hence, second piston 48 (P2) reaches the position of flat segment 162 at about 5 degrees of rotation, while first piston 18 (P1) reaches that same position at 185 degrees.

The bearing surface in raceway 86 is shaped to accelerate the first piston 18 in a positive displacement direction (as bearing tip 23 rides up segment 160) through about 180 degrees of rotation to progressively reduce the volume of first pumping chamber 36 and force fluid out of that pumping chamber. Tip 23 of piston 18 then reaches the flat segment 162, which holds the positive displacement of the first piston 18 at a constant maximum displacement position through about 72 degrees of cam 80 rotation, during which fluid is neither drawn into nor expelled from chamber 36. Tip 23 then rides down over segment 164, to displace piston 18 (with the bias of spring 28) in a negative displacement direction through about 72 degrees of cam rotation until a maximum negative displacement position is reached as piston 18 arrives at segment 166 of groove 84. Piston 18 occupies constant negative displacement position 166 through about 36 degrees of cam rotation, during which fluid is neither drawn into nor expelled from chamber 36. During negative displacement of first piston 18, fluid is drawn into first pumping chamber 36 as that chamber volume expands.

The continuous impingement of the rotating annular control groove against both piston tips 23, 53 provides simultaneous movement of second piston 48 as first piston 18 is moving, but 180 degrees out of phase with each other, as shown in FIG. 10.

Displacement of the first piston 18 in the positive displacement direction along segment 160a begins at about 5 degrees rotation, as arbitrarily shown at A in FIG. 10. The beginning of positive displacement of first piston 18 coincides with second piston 48 first reaching it maximum positive displacement at segment 162. Displacement of first piston 18 in the positive displacement direction along segment 160 continues during the entire period in which the second piston 48 is in maximum positive displacement along segment 162. Positive displacement of piston 18 also continues while second piston 48 is displaced in the negative displacement direction as tip 53 moves along segment 164 (beginning at B), and reaches the maximum negative displacement position of the second piston at segment 166 (at C). Maximum constant positive displacement of first piston 18 begins as tip 23 initially rides on to segment 162 (at D), at the same time that displacement of the second piston 48 in the positive direction begins.

Displacement of first piston 18 in the negative displacement direction begins at E as tip 23 begins to ride down segment 164. Point E occurs about midway through displacement of the second piston 48 in the positive displacement direction (as tip 53 rides along segment 160). The first piston 18 reaches its maximum negative displacement position at F during the continued displacement of second piston 48 in the positive displacement direction. Hence, the period from E to F to A all occurs during the latter one-half of the positive displacement stroke of second piston 48 from D to A. Therefore, the period during which fluid is drawn into each piston is shorter than the period during which fluid is pumped out. In the disclosed embodiment, the period of pumping out is approximately three times longer than the period of pumping in.

Control valve 100 is fixed to and rotates with cam 80, about a common axis 90. As cam 80 rotates to actuate the piston pumps 14, 16, the control valve rotates to direct the flow of fluid through inlet and outlet paths. Control valve 100 moves between a first position shown in FIG. 5, and a second position shown in FIG. 4. In the first position (FIG. 5), fluid communication is established between the inlet line 142 and first pumping chamber 36 through passageway 146. Inlet line 142 communicates through bore 140 with groove 132, and passageway 146 communicates through bore 144 with groove 136 when the control valve is in the position shown in FIG. 5. Hence fluid can flow through the communicating passageways formed by grooves 132, 134 and 136 to establish fluid communication between inlet line 142 and chamber line 146. This fluid communication continues as long as bore 144 is above arcuate groove 136, and the arcuate shape of groove 136 maintains it below bore 140 through about one-quarter (90 degrees) of the rotation of control valve 100.

With the control valve in this same position (FIG. 5), outlet line 152 communicates through bore 150 with cross portion 122 at axis of rotation 124, and passageway 156 communicates through bore 154 with arcuate groove 120. Hence inlet line 152 communicates with second pumping chamber 66 through line 156 when the control valve is oriented as in FIG. 5. Continuous fluid communication is established because the passageways formed by grooves 120 and 122 are continuous, and interconnect lines 152, 156. Bore 150 is always positioned above center of rotation 124, and the passageway formed by groove 120 will remain positioned below bore 154 through about one-half rotation of control valve 100 because of the arcuate shape and length of the groove.

When control valve 100 rotates through 180 degrees around axis 90, it reaches the position shown in FIG. 4, at which time inlet line 142 is connected with second pumping chamber 66 through line 156, and first pumping chamber 36 is connected with outlet line 152. Inlet line 142 always communicates with groove 132 on control valve 100 through bore 140, because the continuous annular groove 132 forms a complete circle that is always positioned below bore 140 as control valve 100 rotates. In FIG. 4, line 142 is connected to second chamber 66 because line 156 communicates with groove 136 through bore 154. Grooves 132 and 136 are connected by groove 134, hence fluid flows through the passageways formed by grooves 136, 134 and 132 from inlet line 142 to pumping chamber 66.

With the control valve in the position shown in FIG. 4, outlet line 152 communicates with first pumping chamber 36. Inlet line 152 always communicates through bore 150 with groove 122 at center of rotation 124, throughout the entire rotation of control valve 100. Passageway 146 to first pumping chamber 36 communicates with groove 120 through bore 144 during the period of 90 degree rotation of cam 80, during which the arcuate groove 120 rotates beneath bore 144. Hence fluid may flow from pumping chamber 36, through line 146, into the passageway formed by groove 120, through cross portion 122, and through outlet line 152.

In operation, with control valve 100 in the position shown in FIG. 5, the cam raceway 84 on cam 80 is configured to negatively displace first piston 18 to draw fluid into first chamber 36 during the period in which lines 142 and 146 are connected by control valve 100 as groove 136 rotates beneath bore 144. During this same period, cam 80 moves second piston 48 in a positive displacement direction to force fluid out of second piston chamber 66 and through lines 156, 152 while groove 120 rotates beneath bore 154 for about 200 degrees of rotation of cam 80. Fluid will therefore be drawn into first pumping chamber 36 at the same time that fluid is forced out of second pumping chamber 66. The period during which groove 120 rotates beneath bore 154 is about twice as long as the period during which groove 136 rotates beneath bore 144, hence the period of drawing fluid into chamber 36 is about half as long as the period during which fluid is pumped out of chamber 66.

When the cam and control valve rotate to the position shown in FIG. 4, fluid is pumped through inlet line 142 into second pumping chamber 66, as second piston 48 is displaced downwardly by the force of spring 58 against piston 48. At the same time, fluid moves through line 146 into outlet line 152 as cam 80 displaces first piston 18 upwardly against the bias of spring 28 to reduce the volume of first pumping chamber 36. Fluid is therefore drawn into second pumping chamber 66 at the same time that fluid is forced out of first pumping chamber 36. The period during which groove 120 rotates beneath bore 144 is about twice as long as the period during which groove 136 rotates beneath bore 154. Hence, the period during which the control valve establishes fluid communication between lines 146 and 152 for outflow, is about twice as long as the period during which the control valve establishes fluid communication between lines 142 and 156 for inflow into chamber 66.

Figure 1:
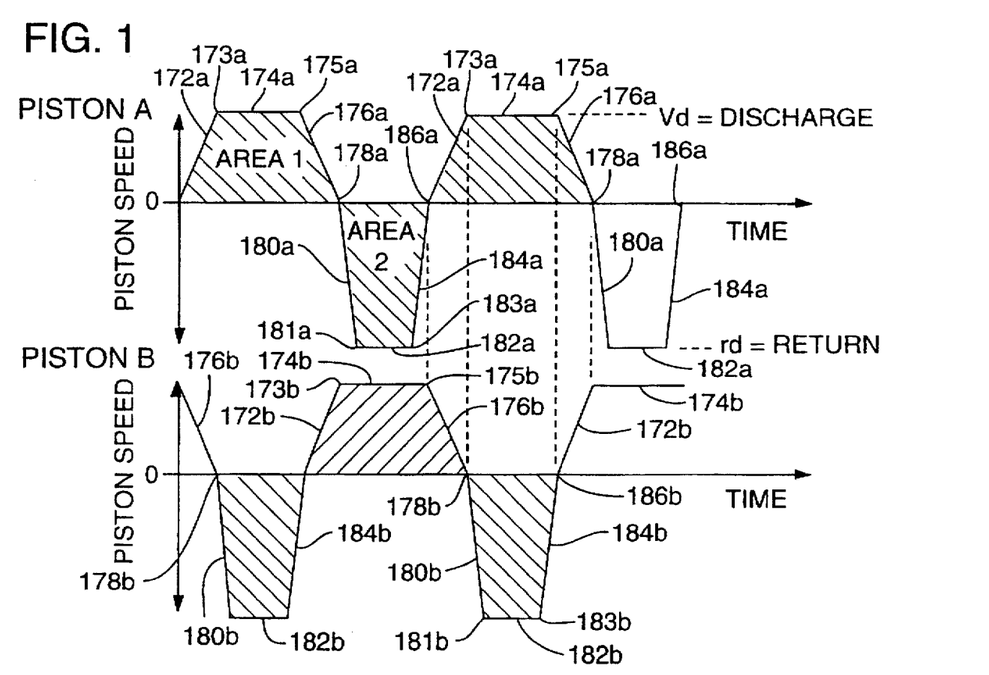
FIG. 1 is a graph showing piston speed versus time for the first piston (piston A) and second piston (piston B) of the dual piston pump, with the respective inputs and outputs of the two pistons shown within the curves of the graphs.
Figure 2:
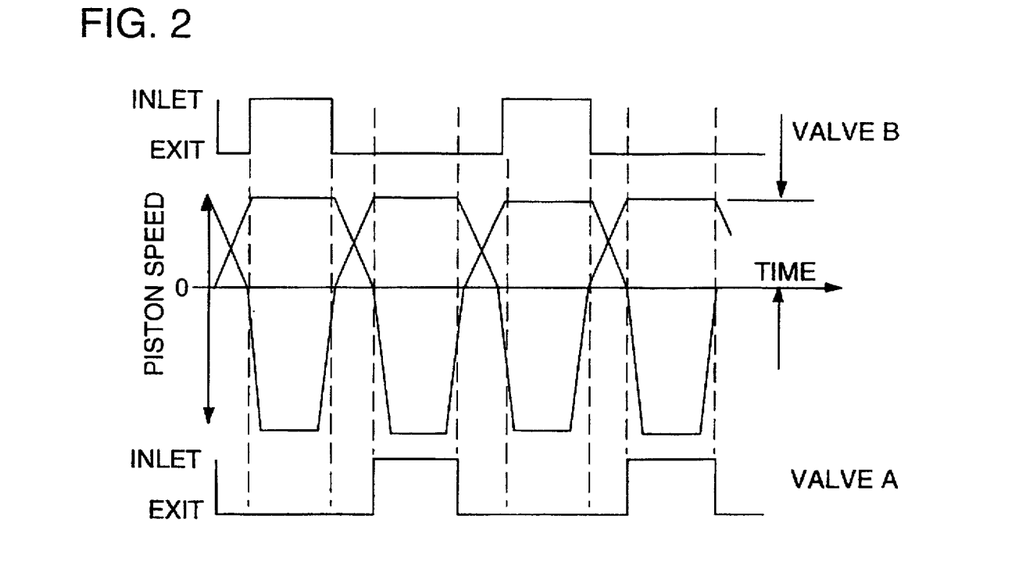
FIG. 2 is a graph similar to FIG. 1, but showing the superimposed inputs and outputs of pistons A and B in FIG. 1, and the corresponding position of the valve.

The effect of these superimposed, staggered inputs and outputs of varying duration from the first and second piston pumps 16, 18 is shown schematically in the graphs of FIGS. 1 and 2. FIG. 1 represents piston speed versus time, and the area enclosed within each graph is proportional to the volume of fluid displaced by each piston. Fluid output for first 18 is shown as Piston A, and fluid output for second piston 48 is shown as Piston B. Enclosed areas above the x-axis are volumes pumped out, while areas enclosed below the x axis are volumes drawn into the piston chamber. Piston A accelerates rapidly in an output power stroke 172a which begins to deliver fluid from pump 10, then at 173a achieves a substantially constant power stroke speed 174a for a period of time. At 175a, it slows rapidly along line 176a to a stop point at 178a. It then begins its return or input stroke at an even greater speed along line 180a, at 181a achieves a stable return stroke speed along line 182a, then at 183a slows rapidly along line 184a to a stop point 186a.

The graph for piston speed versus time of second piston pump 16 (Piston B) is similar, but is offset by 180 degrees along the time axis. Piston B accelerates rapidly in an output power stroke 172b, then at 173b achieves a substantially constant power stroke speed 174b for a period of time. At 175b it slows rapidly along line 176b to a stop point at 178b. It then begins its return stroke at an even greater speed along line 180b, achieves at 181b a stable return stroke speed along line 182b, then at 183b slows rapidly along line 184b to a stop point 186b.

A simplified schematic time relationship between the output power strokes and input strokes is shown by dotted lines in FIG. 1, which interconnect simultaneous time events for the two piston pumps 14, 16. Return strokes 180–184 occur more rapidly than output power strokes 172–178, such that output power strokes are able to partially overlap and superimpose their fluid outputs. This summation of outputs provides a substantially constant fluid output from the pump 10, as shown in FIG. 2. The output power stroke of Piston A begins at 186a, coincident with the time that the output power stroke of piston B begins to reverse at 175b. Acceleration to output power stroke along 172a coincides with the deceleration of the output stroke in Piston B. The entire period of the input power stroke 178b–186b then occurs, and takes the same amount of time as the constant velocity portion 174a of the output stroke of Piston A. Acceleration of the output stroke of Piston B along 172b then occurs in the same time that deceleration of the output stroke of Piston A occurs along 176a. The entire input stroke of Piston A (180a,182a,184a) then occurs during the same time that constant velocity portion 174b of output stroke for Piston B occurs. In this manner, the output strokes of Pistons A and B overlap, as shown in FIG. 2, to provide a substantially constant flow rate from pump 10.

Figure 6A:
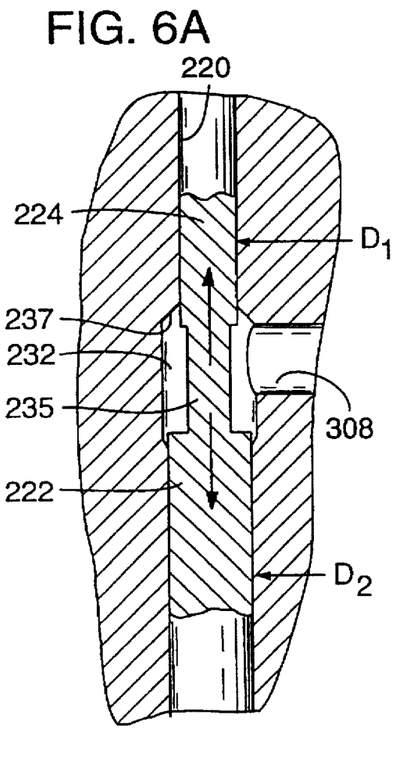
FIG. 6A is an enlarged, cross-sectional view through one of the piston bores illustrating the differential piston area that is proportional to volumetric displacement.
Figure 8:
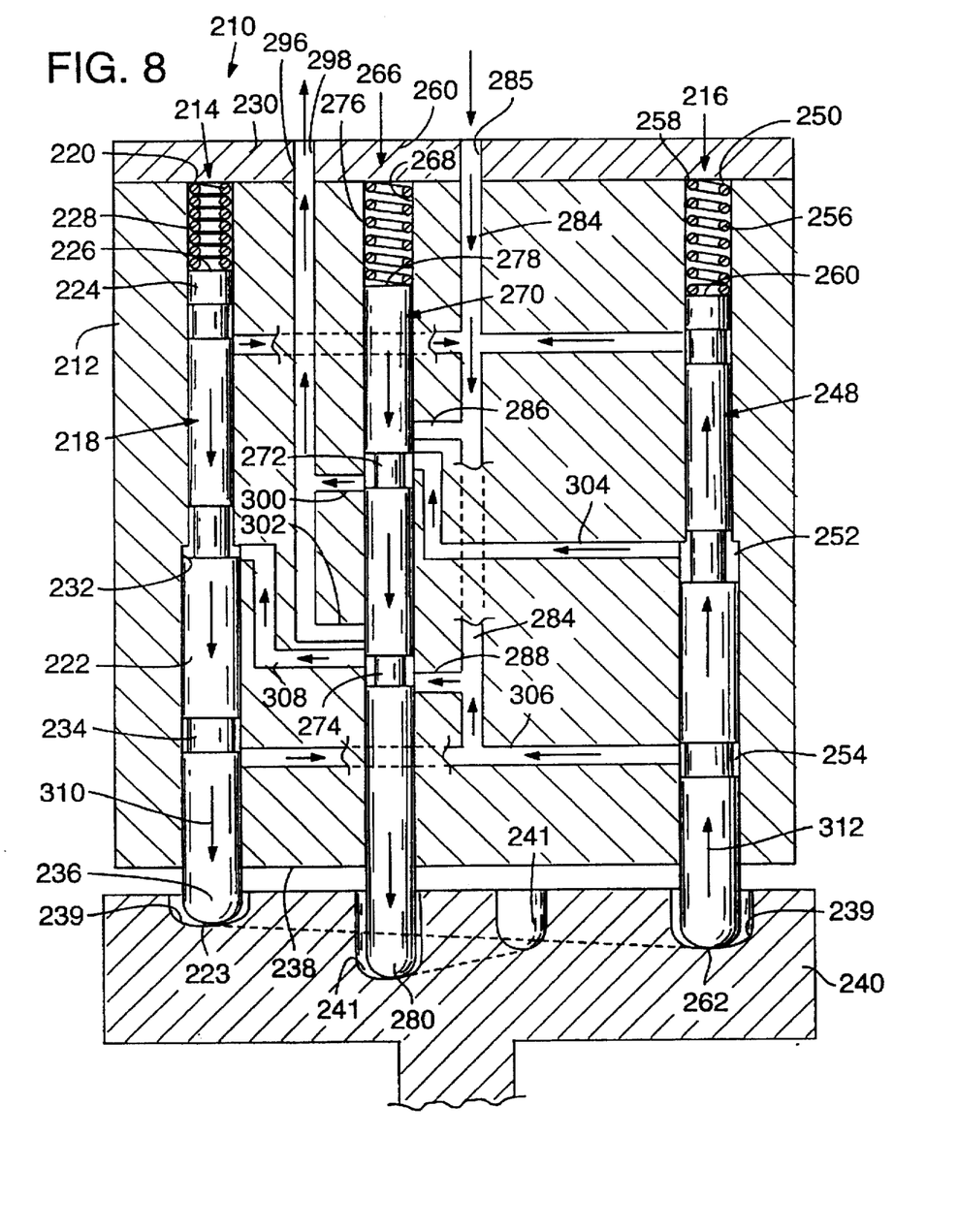
FIG. 8 is a schematic cross-sectional view of a second embodiment of a pump, in which the control valve is in a first position, wherein the inlet communicates with the pumping chamber of the first piston, and the outlet communicates with the pumping chamber of the second piston.
Figure 9:
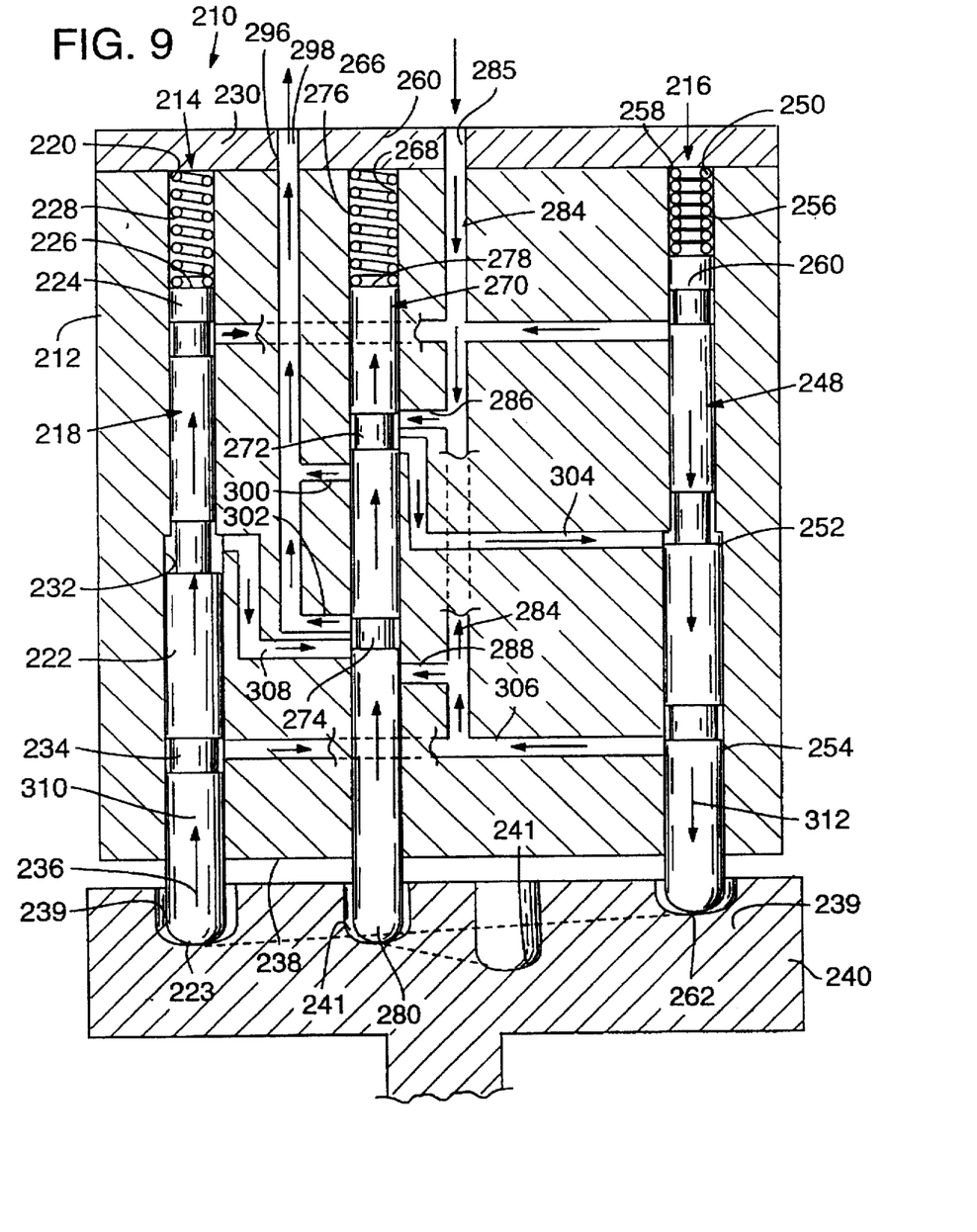
FIG. 9 is a view of the piston pump of FIG. 8, but in which the control valve has been moved to a second position in which the inlet communicates with the second pumping chamber, and the outlet communicates with the first pumping chamber.

A second embodiment of the invention is shown in FIGS. 6, 8 and 9, in which the control valve is a spool valve. As in the earlier described embodiment, pump 210 is capable of substantially pulseless delivery of a fluid, such as liquid water. The pump includes a housing 212 that contains first piston assembly 214 and second piston assembly 216. First piston assembly 214 includes a reciprocating first piston 218 in a first piston bore 220. Piston 218 has a first large diameter portion 222 with a rounded bearing tip 223, and a second large diameter portion 224, with a flat top surface 226. Piston 218 is capable of reciprocating in bore 220 against the bias of a helical spring 228 that seats against and extends between a housing cover 230 and surface 226 of piston 218.

Figure 6B:
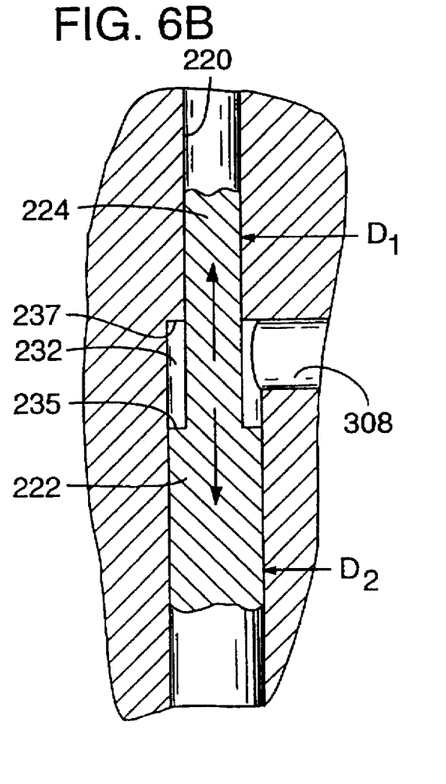
FIG. 6B is an alternative pumping chamber embodiment.

A series of pumping chambers 232, 234 are located along piston 218, and are formed by necked down diameter portions of the piston. FIG. 6 illustrates a representative pumping chamber 232 in which portions 222, 224 of piston 218 meet at necked down portion 235. A clearance seal circumscribes portion 224, and clearance seal circumscribes portion 222, delimiting chamber 232 therebetween to form chamber 232. Hence, chamber 232 varies in volume as piston 218 reciprocates in the bore. An alternative embodiment of the pumping chamber is shown in FIG. 6B wherein portion 222 necks down to a portion 224 that then reciprocates in a narrower diameter piston bore.

A bearing end of piston 218 extends beyond a bottom surface 238 of housing 212 and engages raceway 239 in a cam 240, similar to the cam 80 discussed in connection with an earlier embodiment. The cam has the same principle of operation as the cam 80, at least with respect to reciprocation of pistons 218, 248, and it will not be described again. The surface of the cam raceway 239 is the same as the surface configuration of raceway 84.

Second piston assembly 216 is similar to piston assembly 214 described above. Second piston assembly 216 includes a reciprocating piston 248 in second piston bore 250. Piston 248 has a series of necked down portions that form chambers 252 and 254. Piston 248 is capable of reciprocating in bore 250 against the bias of a helical spring 258 that seats against and extends between housing cover 230 and surface 260 of piston 218. A bearing end 262 of piston 248 extends beyond the bottom surface 238 of housing 212 and engages raceway 239.

A spool valve 266 is provided in a bore 268 that extends through housing 212 parallel to bores 220, 250. Bore 268 is offset from the longitudinal axis of housing 212. The spool valve includes a reciprocating piston 270 in bore 268. Piston 270 has two necked down portions that form chambers 272, 274 that provide flow paths through spool valve 266. Piston 270 is capable of reciprocating in bore 268 against the bias of a helical spring 276 that seats against and extends between housing cover 230 and surface 278 of piston 270. A bearing end 280 of piston 270 extends beyond the bottom surface 238 of housing 212 and engages a cam raceway 241, which reciprocates piston 270 in a manner described below.

An inlet line 284 opens at an orifice 285 on the exterior of housing 212, and line 284 extends through the housing parallel to spool valve bore 268, and between spool valve 266 and second piston 248. Communicating fluid lines 286, 288 extend from inlet line 284 to spool valve bore 268. Line 286 communicates with chamber 272 when the spool valve is in the position shown in FIG. 9, but not when the spool valve is in the position shown in FIG. 8. Line 288 is positioned to communicate with chamber 274 when the spool valve is in the position shown in FIG. 8, but not when the spool valve is in the position shown in FIG. 9.

An outlet fluid line 296 extends through the housing 212 parallel to spool valve bore 268, and opens through the exterior of housing 212 at orifice 298. Lines 300, 302 extend from line 296 to spool valve bore 268. Line 300 communicates with chamber 272 when the spool valve is in the position shown in FIG. 8, but not when the spool valve is positioned as in FIG. 9. Line 302 communicates with chamber 274 when the spool valve is in the position shown in FIG. 9, but not when the spool valve is in the position shown in FIG. 8.

Lines 304, 306 communicate between chambers 252, 254 and chambers 272, 274. Line 304 always communicates with chambers 252 and 272, at all times throughout reciprocation of spool valve 270. Line 306 always communicates with chamber 254, but only communicates with chamber 274 when the spool valve is in the position shown in FIG. 8. Line 306 thereby serves as a fluid leak line to redirect fluid, that bleeds past clearance seals, back into the pump. Another line 308 communicates between chamber 274 and chamber 232. Line 308 always communicates with chambers 274 and 232 as the spool valve reciprocates.

In operation, cam 240 moves the pistons 214, 248 and spool valve piston 270 between the positions shown in FIGS. 8 and 9. Referring first to FIG. 9, in which the spool valve is in the position shown, piston 248 is moving down while piston 218 is moving up. Fluid flows from a supply source (not shown) through orifice 285 into lines 284 and 286. Fluid in line 284 is able to communicate with line 304 through chamber 272 with which both lines 284, 304 communicate. With the spool valve in this position, simultaneous downward movement of piston 248 creates a negative pressure that draws fluid through line 284, 286, chamber 272, and into line 304 and chamber 252.

Simultaneous with the drawing of fluid into chamber 252 in FIG. 9, piston 218 is moving upwardly and forcing fluid out of its chamber 232. As chamber 232 diminishes in volume, fluid is forced out of chamber 232, through line 308, chamber 274, and into lines 302, 296. Hence fluid within chamber 232 is expelled through outlet 298 while new fluid is drain in through inlet 285 into chamber 252.

Cam 240 is continuously rotating through repeated 360 degree rotations during operation of the valve 210, and the bearing surface of the cam has a pair of concentric raceways 239, 241 that move the pistons of the valve by impinging against their ends 236, 262 and 280. After cam 240 rotates through 180 degrees from the position shown in FIG. 9, the pistons 218, 248 and 270 are in the position shown in FIG. 8, with spool valve piston 270 having moved down, piston 218 moving downwardly in the direction of arrow 310, and piston 248 moving upwardly in the direction of arrow 312.

With the pistons arranged as in FIG. 8, fluid still moves in through line 284, but it can no longer communicate with chamber 252 because spool valve 270 has moved downwardly from the position it occupied in FIG. 9. Instead, fluid moves through inlet line 284, into line 288, thence to spool valve chamber 274 and into chamber 232 through line 308. The piston 218 is moving down, hence supplying negative pressure in chamber 232 that draws fluid into chamber 232 from inlet line 284.

Simultaneous with movement of fluid into chamber 232 (FIG. 8), upward movement of the other piston 248 is expelling fluid from chamber 252. As piston 248 moves up, positive pressure in that chamber forces fluid out through line 304, which communicates with chamber 272, that in turn communicates with lines 300 and 296. Fluid forced out by chamber 252 is expelled through outlet orifice 298.

Cam 240 continues to rotate, and after a further 180 degree rotation from that shown in FIG. 8, will once again assume the configuration shown in FIG. 9. The continuous upward and downward movement of piston 218, 248, with the varying position of spool valve 266, provides for a continuous flow of fluid out of the valve. The outputs and inputs of pistons 218, 248 will follow the pattern shown in FIG. 1, and the superimposed flows of the two pistons will provide a substantially uniform flow output, as demonstrated in FIG. 2.

Line 306 is a fluid leak return line that helps diminish the amount of liquid that leaks out of the pump. Liquid can seep past the clearance seals around chamber 252. The seeping liquid will reach chamber 254, and be directed back into the inlet line through line 306. Other leak lines are shown in FIGS. 8 and 9 (for example from chamber 234), and their function is the same as line 306.

Having illustrated and described the principles of the invention in preferred embodiments, it should be apparent to those skilled in the art that the invention can be modified in arrangement and detail without departing from such principles. Therefore, the illustrated embodiments should be considered only as preferred examples of the invention and not as a limitation on the scope of the claims. I therefore claim as my invention all modifications and equivalents to the illustrated embodiments coming within the scope and spirit of following claims.

We claim:

1. A rotary control valve for directing a flow of fluid through the valve, comprising:

a control member having a control surface, and a cover juxtaposed to the control surface, wherein the surface and cover move relative to each other through a plurality of positions;

a fluid passageway cooperatively formed between the cover and control surface;

first and second bores through the cover, wherein the bores are both in fluid communication with the fluid passageway in at least one of the plurality of positions, as the control surface and cover move relative to each other, to direct the flow of fluid through the fluid passageway and control valve; and wherein the control valve is incorporated into a pump in which reciprocating pistons move fluid through the pump, and the pistons are reciprocated by a cam, and the control member is mounted to and rotates with the cam.

2. A rotary control valve for directing a flow of fluid through the valve, comprising:

a control member having a control surface, and a cover juxtaposed to the control surface, wherein the surface and cover move relative to each other through a plurality of positions;

a fluid passageway cooperatively formed between the cover and control surface;

first and second bores through the cover, wherein the bores are both in fluid communication with the fluid passageway in at least one of the plurality of positions, as the control surface and cover move relative to each other, to direct a flow of fluid through the fluid passageway and control valve;

wherein the first bore is an inlet bore connected to an inlet line, and the second bore is an outlet bore connected to an outlet line, and movement of the control surface and cover relative to each other brings the inlet bore and outlet bore simultaneously into fluid communication with the passageway such that fluid flows from the inlet line, through the passageway, and out of the outlet line;

wherein the control member is a disc, and the control surface is a flat surface of the disc, and the disc rotates about an axis of rotation relative to the cover, and the passageway is cooperatively formed by the cover and a groove in the control surface, wherein the passageway includes a first passageway portion that falls on a first circle having a center of curvature at the axis of rotation of the disc, and a distance of the first bore from the axis is substantially the same as a radius of the first circle, such that the first passageway portion is in fluid communication with the first bore as the disc rotates through at least a portion of its rotation, and the passageway further includes a second passageway portion that is in fluid communication with the second bore through at least a portion of the rotation of the disc.

3. The control valve of claim 2, wherein the second passageway portion falls on a second circle having a center of curvature at the axis of rotation of the disc, but a radius different than the radius of the first circle, and the first and second passageway portions are fluidly connected by a third passageway portion.

4. The control valve of claim 2, wherein the second passageway portion is at the axis of rotation of the disc, and the first and second passageway portions are fluidly interconnected by a third passageway portion.

5. A rotary valve that directs a flow of fluid through the valve, comprising:

a control member having a control surface, and a cover juxtaposed to the control surface, wherein the surface and cover move relative to each other through a plurality of positions;

first and second fluid passageways cooperatively formed by and between the cover and grooves in the control surface;

first, second, third and fourth bores through the cover, wherein the first bore is an inlet bore, and the second bore is an outlet bore;

wherein the first fluid passageway comprises a first portion that is always in fluid communication with the first bore as the surface and cover move relative to each other, and a second portion that is in fluid communication with the third bore in only some of the plurality of positions;

wherein the second fluid passageway comprises a first portion that is always in fluid communication with the second bore, and a second portion that is in fluid communication with the fourth bore in only some of the plurality of positions; and wherein the second portion of the first fluid passageway is in fluid communication with the fourth bore in some of the plurality of positions, and the second portion of the second fluid passageway is in fluid communication with the third bore in some of the plurality of positions, but the first and second fluid passageways are never in fluid communication with each other.

6. The rotary valve of claim 5 therein the control member is a disc that rotates about an axis of rotation relative to the cover.

7. The rotary valve of claim 6 wherein the control valve is incorporated into a pump in which reciprocating pistons move fluid through the pump, and the pistons are reciprocated by a cam, and the control member is mounted to and rotates with the cam.

8. The rotary valve of claim 5 wherein the control member is a disc that rotates about an axis of rotation relative to the cover, the control surface is a flat surface of the disc, and the first portion of the first passageway is an annulus that lies on a first circle having a center of curvature at the axis of rotation and a radius that is the same as the distance of the first bore from the axis of rotation, and the first portion of the second passageway is at the axis of rotation, and the second bore extends through the cover at the axis of rotation and always communicates with the first portion of the second passageway as the disc rotates, and the second portions of the first and second passageways are arcuate and both lie on non-overlapping portions of a second circle having a center of curvature at the axis of rotation, and a radius that is smaller than the radius of the first circle and the same as the distance from the axis of the third and fourth bores.

9. A rotary valve for directing first and second pulsed flows of liquid through the valve, comprising:

an inlet line and an outlet line;

a control disc having a flat control surface, and a cover with a flat inside face that bears against the control surface, wherein the disc rotates relative to the cover about an axis of rotation, and grooves in the control surface form, in cooperation with the overlying cover, an inlet passageway and outlet passageway that do not communicate with each other;

first, second, third and fourth bores extending through the cover, wherein the first bore is an inlet bore that communicates with the inlet line, and the second bore is an outlet bore that communicates with the outlet line;

wherein the inlet passageway comprises an annular inlet passageway circumscribing an arcuate inlet passageway, and the annular and arcuate inlet passageways both have substantially the same center and radius of curvature, and a communicating passageway extends radially on the control surface between the annular and arcuate passageways, and the outlet passageway comprises an arcuate outlet passageway with a center of curvature at the axis, and a communicating arm that extends from the arcuate outlet passageway to the center of curvature of the arcuate outlet passageway, and the distance from the axis to the arcuate inlet and outlet passageways is substantially the same; and wherein the second bore extends through the cover at the axis to communicate with the arm of the outlet passageway, the distance between the axis and first bore is substantially the same as the distance from the axis to the annular inlet passageway, and the distance between the axis and the third and fourth bores is substantially the same as the radius from the axis to the arcuate inlet and outlet passageways.

10. The control valve of claim 9 wherein the first, second, third and fourth bores are aligned along a common diameter of the disc.

11. The control valve of claim 9 further comprising a dual piston pump that provides the first and second pulsed flows, wherein the pump comprises a first reciprocating piston pump with a first pumping chamber, and a second reciprocating piston pump with a second piston chamber, wherein each of the first and second piston pumps reciprocates to alternately draw fluid in and pump fluid out, and the piston pumps are both reciprocated by a common cam member that rotates about an axis of rotation with a non-arcuate face having a bearing surface that reciprocates the piston pumps, and the third bore communicates with the first pumping chamber and the fourth bore communicates with the second pumping chamber.

12. The control valve of claim 11, wherein the control member is mounted to and rotates with the cam about a common axis of rotation.

13. The control valve of claim 12 wherein the bearing surface of the cam has an impingement surface shaped to impinge the pistons, and the impingement surface is shaped to reciprocate the pistons such that the fluid delivery from the pump is substantially constant.

14. The control valve of claim 9 wherein the second portion of the first passageway has a length that subtends an arc, as measured from the axis, that is less than the length of an arc, as measured from the axis, subtended by the second portion of the second passageway.

15. The control valve of claim 14 wherein the arc subtended by the second portion of the first passageway is about 90 degrees, and the arc subtended by the second portion of the second passageway is at least 180 degrees.

16. A rotary control valve in a pump, comprising: a rotary control member having a rotatable control surface having first and second flow channels inscribed in the control surface, without extending through the control member, wherein the first of the flow control channels is an arcuate channel and the second flow channel is a linear flow channel that intersects the arcuate first channel;

a stationary control plate that fits against the control surface to form closed passageways between the control plate and the first and second channels in the control surface, wherein the control plate includes a first opening through the control plate positioned to communicate with the first channel through at least part of the rotation of the surface, and a second opening through the control plate positioned to communicate with the second channel through at least part of the rotation of the surface, to establish a continuous flow pathway from the first opening to the second opening during only a part of the rotation of the control surface:

wherein the second flow channel communicates with a center of rotation of the control surface, and the second opening through the control plate communicates with the second flow channel at the center of rotation of the control surface.

17. The rotary control valve of claim 16, further comprising third and fourth flow channels, wherein the third flow channel is an arcuate channel that is concentric with the fourth flow channel which is also arcuate, and a communicating channel is inscribed in the control surface between the third and fourth flow channels, and the communicating channel does not extend through the rotary control member.

18. The rotary control valve of claim 16, further comprising a piston pump that pumps fluid through the rotary control valve, wherein fluid flows to or from the pump through the continuous flow pathway when the continuous flow pathway is established from the first opening through the control plate to the second opening through the control plate.

19. A rotary control valve in a pump for dispersing metered amounts of a liquid, comprising:

a rotary control member comprising a rotary control surface having flow channels inscribed in the control surface, wherein the flow channels do not extend through the control member, and wherein the flow channels further comprise an outer annular channel circumscribing a first inner arcuate channel that communicates with the outer annular channel, and a second inner arcuate channel circumscribed by and not communicating with the outer annular channel or first arcuate inner channel, wherein the first and second annular channels extend in a common circle on the control surface, and a linear channel extends from the second inner arcuate channel to a center of rotation of the control surface; and a stationary control plate that fits against the control surface to form closed passageways between the control plate and the channels in the control surface, wherein the control plate includes a first opening through the control plate positioned to communicate with the outer annular channel throughout the rotation of the control surface, a second opening through the control plate positioned to alternatively communicate with the first arcuate inner channel and second inner arcuate channel as the control surface rotates against the control plate, a third opening positioned to communicate with the center of rotation of the control surface throughout the rotation of the control surface, and a fourth opening positioned to alternatively communicate with the first inner arcuate channel and second inner arcuate channel as the control surface rotates against the control plate.

20. The rotary control valve of claim 19, further comprising a multiple piston pump that is reciprocated by a cam that rotates with the control member, wherein the multiple piston pump provides metered flow in a first direction and a second direction, and the flow in the first direction passes through the first opening and alternately the second and fourth openings, and the flow in the second direction passes through the third opening and alternately the second and fourth openings.

21. The rotary control valve of claim 19, further comprising a multiple piston pump, in which the multiple pistons pump staggered inflow to the pump and outflow from the pump, and rotation of the control member sequentially establishes communication, through the flow channels on the control surface, between each piston and an outflow line and an inflow line.

22. The rotary control valve of claim 21, wherein the multiple piston pump comprises first and second piston pumps which reciprocate out of phase with one another, such that the first piston pump provides outflow from the pump while the second piston pump provides inflow to the pump, and the first piston pump provides inflow to the pump while the second piston pump provides outflow from the pump, and the pump further comprises an outflow line in communication with one of the annular channel or center of rotation, and an inflow line in communication with the other of the annular channel or center of rotation.

23. A rotary control valve for directing a flow of fluid through the valve, comprising:

a control member having a control surface, and a cover juxtaposed to the control surface, wherein the surface and cover rotate relative to each other, through a plurality of positions;

first and second fluid passageways cooperatively formed between the cover and control surface;

a first primary bore through the cover and in fluid communication with the first fluid passageway throughout rotation of the surface and cover relative to each other, and a second primary bore through the cover and in fluid communication with the second fluid passageway throughout rotation of the surface and cover relative to each other;

a first secondary bore through the cover, and a second secondary bore through the cover, wherein the first and second fluid passageways are positioned to be alternately moved into fluid contact with the first and second secondary bores as the surface and cover rotate relative to each other; and wherein the control valve is incorporated into a pump in which reciprocating pistons move fluid through the pump, and the pistons are reciprocated by a cam, and the control member is mounted to and rotates with the cam.

24. A rotary control valve for directing a flow of fluid through the valve, comprising:

a control member having a control surface, and a cover juxtaposed to the control surface, wherein the surface and cover rotate relative to each other through a plurality of positions;

first and second fluid passageways cooperatively formed between the cover and control surface;

first and second primary bores through the cover, wherein the first primary bore is in fluid communication with the first fluid passageway throughout rotation of the surface and cover relative to each other, and the second primary bore is in fluid communication with the second fluid passageway throughout rotation of the surface and cover relative to each other;

first and second secondary bores through the cover, wherein the first and second fluid passageways are positioned to be alternately moved into fluid contact with the first and second secondary bores as the surface and cover rotate relative to each other;

wherein the first primary bore is an inlet bore connected to an inlet line, and the second primary bore is an outlet bore connected to an outlet line, and movement of the control surface and cover relative to each other positions the passageways such that the intake bore is brought into fluid communication with one of the secondary bores connected to a piston pump having a reciprocating piston on an intake stroke, and the outlet bore is brought into fluid communication with one of the secondary bores connected to a piston pump having a reciprocating piston on an exhaust stroke, such that fluid flows from the inlet line, through the passageway to the piston on the intake stroke, thereafter from the same reciprocating piston on the exhaust stroke to the outlet line;

wherein the control member is a disc, and the control surface is a flat surface of the disc, and the disc rotates about an axis of rotation relative to the cover, and the passageways are cooperatively formed by the cover and a groove in the control surface, wherein the first passageway includes a circular portion arranged to be in fluid communication with the inlet bore throughout rotation of the disc, and a semi-circular portion which is arranged to bring that first passageway into fluid communication with one of the secondary bores during only a portion of the rotation of the disc, and the second passageway includes a portion arranged to be in fluid communication with the outlet bore throughout rotation of the disc, and a part-circular portion which is arranged to bring the second passageway into fluid communication with one of the secondary bores during at least a portion of the rotation of the disc.

25. A rotary control valve in a pump, comprising:

a rotary control member having a rotatable control surface having first and second flow channels inscribed in the control surface, without extending through the control member, wherein the first of the flow control channels includes an arcuate control portion which communicates with a circular channel portion of greater diameter, and a second of the flow control channels includes an arcuate control portion of a same radius as the arcuate control portion of the first flow control channel, wherein the arcuate control portion of the second flow control channel communicates with a circular channel of a smaller diameter than the arcuate control portion of the second flow control channel;

a plurality of reciprocating pistons;

a stationary control plate that fits against the control surface to form closed passageways between the control plate and the first and second flow control channels in the control surface, wherein the control plate includes a first primary opening through the control plate positioned to communicate with the circular portion of the first channel, and a second primary opening through the control plate positioned to communicate with the circular portion of the second flow control channel, and a first secondary opening and a second secondary opening through the control plate, each separately positioned to communicate with the arcuate portions of both the first and second flow control channels, wherein the first and second secondary openings are in constant communication with respective first and second reciprocating pistons, such that each of the first and second primary bores is successively brought into fluid communication with the first and second secondary bores during different portions of the control surface rotation, whereby fluid communication is successively established between each of the reciprocating pistons and the primary inlet bore as the control surface rotates, and fluid communication is successively established between each of the reciprocating pistons and the primary outlet bore as the control surface rotates.

26. The rotary valve of claim 25, wherein a center of radius of the arcuate control portions of the first and second flow control channels are substantially a center of rotation of the control surface.

27. The rotary control valve of claim 25, wherein the second flow control channel communicates with the second primary opening in the control plate at the circular portion of the second flow control channel.

28. The rotary control valve of claim 25, wherein the first flow control channel communicates with the first primary opening in the control plate at the circular portion of the first flow control channel.

29. The rotary control valve of claim 25, wherein fluid flows to each reciprocating piston through the first flow control channel from the primary inlet opening, and subsequently from each reciprocating piston through the second flow control channel to the primary outlet opening.

* * * * *

UNITED STATES PATENT AND TRADEMARK OFFICE
CERTIFICATE OF CORRECTION

PATENT NO.    : 5,718,570
DATED         : February 17, 1998
INVENTOR(S)   : Beckett et al.

It is certified that error appears in the above-identified patent and that said Letters Patent is hereby corrected as shown below:

Title page,
In U.S. Patent Documents, "1/1949" should read --1/1945--.

In Column 1, line 63, "invention to" should read --invention is to--.
In Column 8, line 36, "it maximum" should read --its maximum--.
In Column 10, line 29, "first 18" should read --first piston 18--.
In Column 12, line 48, "is drain in" should read --is drawn in--.

In the Claims:

In Column 14, line 65, "5 therein the" should read --5 wherein the--.
In Column 16, line 42, "surface:" should read --surface;--.

Signed and Sealed this

Fifteenth Day of May, 2001

*Attest:*

NICHOLAS P. GODICI

*Attesting Officer*    Acting Director of the United States Patent and Trademark Office